July 15, 1952     R. J. LIPE ET AL     2,603,053
VINE MOVING DEVICE
Filed July 23, 1948     2 SHEETS—SHEET 1
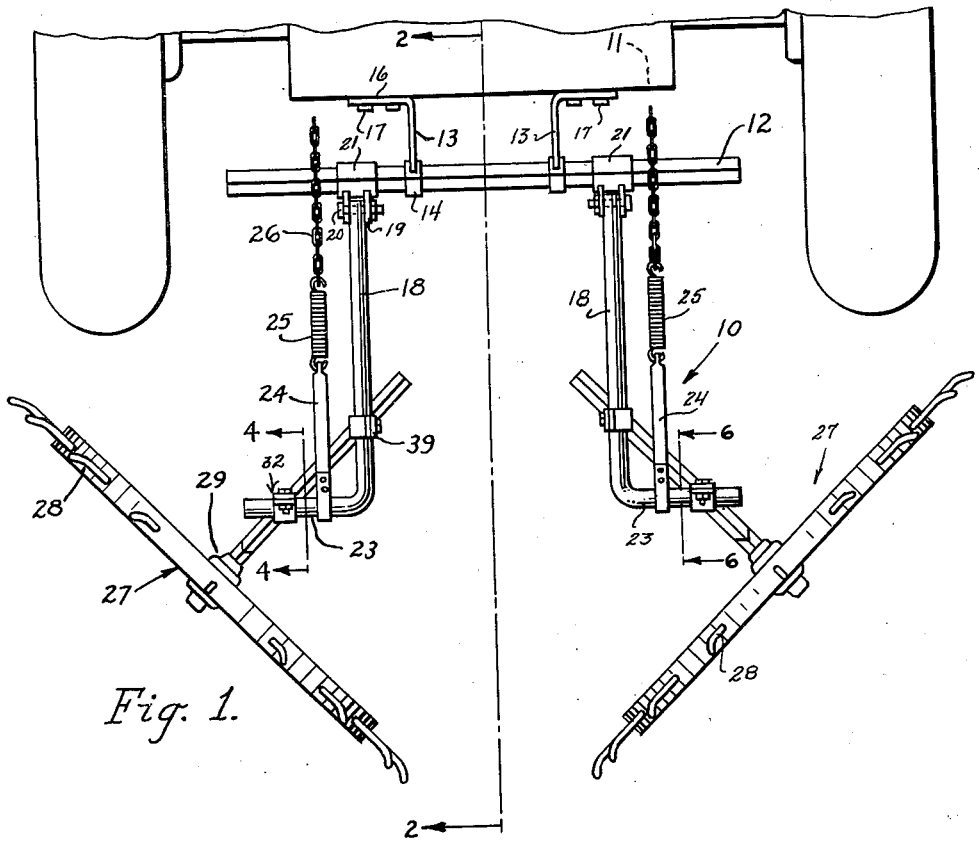
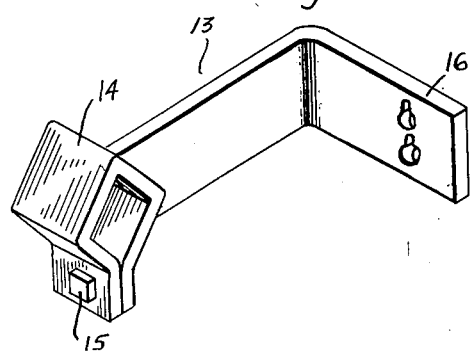
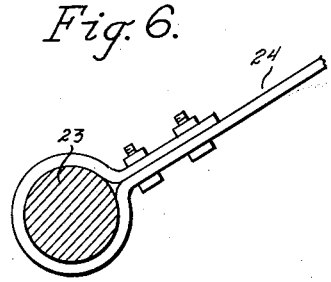
INVENTOR.
ROY J. LIPE
DELBERT C. CASPER
BY Jerome W. Payton
AGENT.

July 15, 1952   R. J. LIPE ET AL   2,603,053
VINE MOVING DEVICE
Filed July 23, 1948   2 SHEETS—SHEET 2
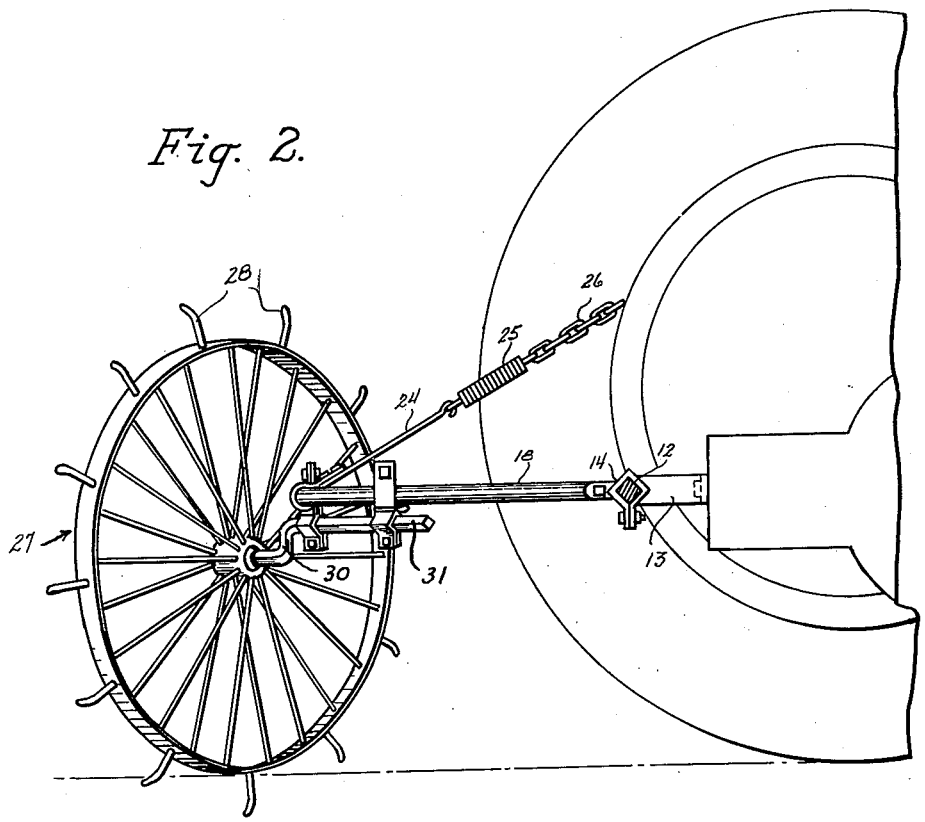
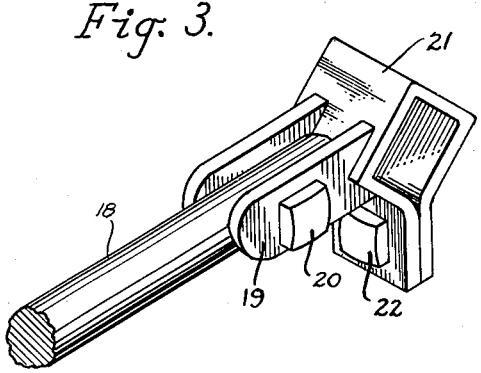
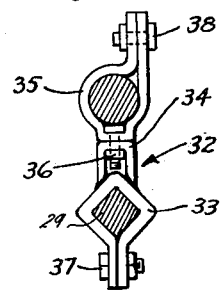
INVENTOR.
ROY J. LIPE
DELBERT C. CASPER
BY
Jerome W. Paxton
AGENT.

Patented July 15, 1952

2,603,053

UNITED STATES PATENT OFFICE 2,603,053

VINE MOVING DEVICE

Roy J. Lipe and Delbert C. Casper, Dietrich, Idaho

Application July 23, 1948, Serial No. 40,333

4 Claims. (Cl. 56—27)

The present invention relates to an agricultural device finding particular application in the harvesting of vine products such as beans, and more specifically has reference to a device adapted to be used with conventional cutting machines for separating dirt and other foreign matter from the cut vines and move the vines into orderly, lose windrows, for subsequent processing.

Generally, after the bean vines have been severed, the vines are raked into windrows which, of course, is a very laborious and time consuming task and additionally, results in a considerable loss of the bean pods. While certain mechanical devices have been heretofore proposed for moving the cut vines into windrows, these prior devices have not gone into universal use, due to the complex nature and rather high cost of the equipment.

According, the salient object of our invention is to provide an attachment for conventional bean cutting machinery which can be easily and quickly attached to all types of farm equipment for cutting the bean vines.

In its broadest aspect, the invention comprises a support which may be detachably secured to the rear of a tractor in such a manner that the support is in substantially parallel relation to the rear of the tractor. Extending rearwardly from the support are a pair of spaced beams, and the free end of each beam supports a wheel disposed at an angle with respect to the beam. The connection between the wheel axle and the beam is such that the angle of the wheel may be altered to compensate for different conditions of the bean vines.

The beams are mounted in such a manner on the support that they may be moved longitudinally of the support for row width adjustments, and the beams together with the wheels may be raised by either a power lift or hand lift when it is not desired to operate the assembly.

By virtue of the present device, it will be appreciated that the beans may be allowed to ripen completely before they are cut, since our attachment will move the vines into windrows right after cutting, so that the products may be immediately combined, thus resulting in fewer immature beans and less likelihood of being subjected to damage by virtue of inclement weather conditions.

Additional objects of our invention are to provide:

1. A device for moving cut bean vines into neat windrows which is simple in construction, positive in operation, and which can be cheaply and easily manufactured.

2. A device of the character described, wherein the wheels for moving the bean vines into windrows are adjustably mounted so that the angular position of the wheel may be quickly and readily adjusted to take care of various conditions which arise.

3. To provide a vine moving device of the type described which may be readily mounted or dismounted on a cutting machine of any conventional character and which will not necessitate material modification of the cutting machine and additionally, having means whereby the vine moving device may be moved to an inoperative position.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a top plan view of our vine moving device in position at the rear of a tractor, the tractor being shown in dot-dash lines.

Figure 2 is a sectional view taken along the line 2—2 of Figure 1, looking in the direction of the arrows.

Figure 3 is a fragmental view in perspective showing the collar whereby the beam for supporting the ground-engaging wheel is secured to its support for sliding movement.

Figure 4 is a sectional view taken along the line 4—4 of Figure 1, looking in the direction of the arrows, but being on a slightly enlarged scale.

Figure 5 is a view in perspective of the bracket whereby the bean moving device is attached to a tractor.

Figure 6 is a view taken along the line 6—6 of Figure 1, looking in the direction of the arrows.

Referring to the drawings, we have shown the bean moving device designated generally 10 as being attached to the rear of a farm tractor 11. The device 10 comprises a bar 12, preferably square in section, which is secured to the tractor 11 by brackets 13. It will be noted that the bracket 13 is provided with a collar 14 at its outer extremity which engages the bar 12, and by manipulation of a nut and bolt assembly 15, the bar is secured in the collar. The bracket terminates at its inner end in a right angled extension 16 and is detachably connected to the tractor by bolts 17. While we have shown the use of two such brackets 13, we wish it to be understood that additional brackets may be employed if the conditions thus warrant. Hence, it can be seen that the device 10 may be readily installed or removed from the tractor by the proper manipulation of the nut 17 and no material modification of the tractor is required for adapting our device for use therewith.

A circular beam 18 is pivotally attached at its inner end to a pair of spaced ears 19, as shown at 20, and the ears are integrally formed with a collar 21 which is mounted on the bar 12 between the bracket 13 and the outer end of the bar. Obviously, the beam may be moved longitudinally of the bar 12 and by tightening a nut and bolt assembly 22 on the collar 21, it is obvious that the collar and hence the beam 18 may be fastly secured to the bar at the desired location. The outer end of the beam 18 is bent at right angles to the beam, as indicated at 23.

An elongated strap 24 is secured at one end to the angular portion 23 of the beam and one end of a helical spring 25 is secured to the free end of the strap. The opposite end of the spring is suitably connected to a chain or similar structure 26 and the opposite end of the chain 26 is operatively coupled to either a power or hand lift carried by the tractor.

It will be appreciated, therefore, that the beam 18 may be raised or lowered by the power lift through the strap, spring, and chain 26.

A wheel 27 having a plurality of spaced fingers or spikes 28 around the rim of the wheel is adapted to be supported by the beam 18. The wheel is provided, of course, with an axle 29 and, as shown in Figure 2, the axle is bent upwardly, as at 30, and thence horizontally, as at 31. As was true of the bar 12, the axle 29 is also preferably formed of square metal stock. The axle is secured to the angular portion of the beam 18 by a clamp assembly designated generally 32. A collar 33, generally similar in structure to the collars 14 and 21, engages the portion 31 of the axle and a U-shaped extension 34 welded or otherwise secured to the upper portion of the collar 33. A split clamp 35 is bolted to the extension 32, as indicated at 36, and engages the angular portion 23 of the beam 18. By operation of nut and bolt assemblies 37 and 38 provided for the collar 33 and the clamp 35, it is apparent that the axle may be secured to the angular portion 23.

A similar clamp assembly designated 39 is employed to secure the axle 29 to the beam 18, and since the assembly 39 is identical in structure to the collar and clamp previously described, it is not thought necessary to elaborate further.

It is thought apparent, therefore, that the angular position of the wheel 27 may be adjusted for different conditions of bean vines by the manipulation of the clamp assemblies 32 and 39.

The operation of our device briefly is as follows:

The bar 12 and its associated parts is attached to the rear end of a tractor by means of the brackets 13. The beams 18 and the wheels 27 are raised upwardly about the pivot points 20 through the operation of either the hand lift or power lift on the truck, and when it is desired to move the cut vines into windrows, the beams are lowered so that the wheels 27 will engage the ground. As the tractor moves along the row, the wheels will rotate by virtue of the contact of the fingers 28 with the ground, thus picking up and agitating the vines, whereby dirt and other foreign matter will be eliminated and the vines deposited in loose windrows rearwardly of the tractor for subsequent processing steps.

By loosening the nut and assemblies of the collars 21, the beams 18 may be moved to any desired position along the bar 12 intermediate the brackets 13, and the free ends of the bar for various row widths and the angle of each wheel 27 relative to its supporting beam 18 may be changed by actuation of the clamps 32 and 39.

We claim:

1. A vine moving device adapted to be attached to a tractor comprising a bar affixed to the rear end of the tractor, a collar slidably mounted on said bar, means to secure said collar to the bar in the desired position, a support pivoted to the collar and terminating in an angular extension, a wheel having an axle, complemental clamping means on said axle and angular extension, and additional complemental clamping means on said axle and support, the said complemental clamping means being adapted to mount the wheel at various angles with respect to the support.

2. A vine moving device adapted to be attached to a tractor comprising a bar affixed to the rear end of the tractor, a pair of spaced collars slidably mounted on said bar, means to secure each collar to the bar in the desired position, a support pivoted to each collar for movement about a horizontal axis and extending outwardly therefrom, an angular extension on the free end of each support, a pair of ground-engaging wheels, an axle for each wheel, complemental clamping means on each axle and each angular extension, additional complemental clamping means on each axle and support, the said complemental clamping means being adapted to mount the wheels at various angles with respect to the supports, and an elevating device operatively connected to each of said supports for moving the supports upwardly and downwardly about their pivots to the collars.

3. A vine moving device adapted to be attached to a tractor comprising a bar carried by the rear end of the tractor, a support pivoted to said bar for movement about a horizontal axis and extending outwardly from said bar, an angular extension on the free end of the support, a wheel having an axle, complemental clamping means on said axle and angular extension, and additional complemental clamping means on said axle and support, the said complemental clamping means being adapted to mount the wheel at various angles with respect to the support.

4. A vine moving device adapted to be attached to a tractor comprising a bar carried by the rear end of the tractor, a pair of spaced supports pivotally mounted to said bar for movement about a horizontal axis and extending outwardly therefrom, an angular extension on the free end of each of said supports, the said extensions extending in opposite directions, a pair of ground engaging wheels, an axle for each wheel, complemental clamping means on each of said axles and angular extensions, and additional complemental clamping means on each of said axles and supports, the said complemental clamping means being adapted to mount the wheels at various angles with respect to the supports.

ROY J. LIPE.
DELBERT C. CASPER.

REFERENCES CITED

The following references are of record in the file of this patent:

UNITED STATES PATENTS

| Number | Name | Date |
|---|---|---|
| 2,371,076 | Stevens | Mar. 6, 1945 |
| 2,447,354 | Morrill | Aug. 17, 1948 |
| 2,459,961 | Pollard | Jan. 25, 1949 |